US007356773B1

(12) United States Patent  
Barraclough

(10) Patent No.: US 7,356,773 B1
(45) Date of Patent: Apr. 8, 2008

(54) WIZARD BUILDER, FOR APPLICATION SOFTWARE, BUILDING A SETUP WIZARD WHICH SETS UP A DEFACTO INTERFACE BETWEEN THE APPLICATION PROGRAM AND MONITORING OR CONTROL EQUIPMENT

(75) Inventor: Richard Alan Barraclough, Wilmslow (GB)

(73) Assignee: Expertune, Inc., Hartland, WI (US)

( * ) Notice: Subject to any disclaimer, the term of this patent is extended or adjusted under 35 U.S.C. 154(b) by 603 days.

(21) Appl. No.: 10/034,467

(22) Filed: Dec. 27, 2001

(51) Int. Cl.
G06F 3/00 (2006.01)

(52) U.S. Cl. .................... 715/762; 715/705
(58) Field of Classification Search ........ 345/705–715, 345/762–763; 717/174; 715/762, 705
See application file for complete search history.

(56) References Cited

U.S. PATENT DOCUMENTS

| 4,648,062 | A |   | 3/1987  | Johnson |
|-----------|---|---|---------|---------|
| 5,029,113 | A |   | 7/1991  | Miyoshi |
| 5,301,326 | A |   | 4/1994  | Linnett |
| 5,388,993 | A |   | 2/1995  | McKiel |
| 5,434,965 | A |   | 7/1995  | Matheny |
| 5,513,308 | A |   | 4/1996  | Mori |
| 5,535,422 | A |   | 7/1996  | Chiang |
| 5,550,967 | A |   | 8/1996  | Brewer |
| 5,581,684 | A |   | 12/1996 | Dudzik |
| 5,602,982 | A |   | 2/1997  | Judd |
| 5,627,958 | A |   | 5/1997  | Potts |
| 5,692,111 | A | * | 11/1997 | Marbry et al. ............. 358/1.15 |
| 5,727,950 | A |   | 3/1998  | Cook |
| 5,859,637 | A |   | 1/1999  | Tidwell |
| 5,966,532 | A | * | 10/1999 | McDonald et al. ......... 717/105 |
| 6,502,234 | B1 | * | 12/2002 | Gauthier et al. ............ 717/107 |
| 6,564,375 | B1 | * | 5/2003  | Jiang .......................... 717/165 |
| 6,833,847 | B1 | * | 12/2004 | Boegner et al. ............ 715/705 |
| 6,871,340 | B1 | * | 3/2005  | Gillis ......................... 717/100 |
| 6,910,208 | B1 | * | 6/2005  | Zimniewicz ................ 717/174 |
| 2002/0054096 | A1 | * | 5/2002 | Thomas ...................... 345/762 |
| 2002/0087966 | A1 | * | 7/2002 | Wiginton et al. ........... 717/174 |
| 2003/0038842 | A1 | * | 2/2003 | Peck et al. .................. 345/763 |

\* cited by examiner

Primary Examiner—David Wiley
Assistant Examiner—Ryan Pitaro
(74) Attorney, Agent, or Firm—Henry L. Smith, Jr.

(57) ABSTRACT

A computer program wizard builder. A method and apparatus are provided whereby a person not familiar with computer programming or computer programming languages can run a wizard to create or alter another wizard which sets up an application program with connection details and properties of industrial monitoring or control equipment. The method allows the setup wizard to be moved to other computers by a person with no computer programming skills. The method is a wizard which builds another wizard. The new wizard is a setup wizard which sets up or forms a de facto interface between the application program and the monitoring or control equipment.

19 Claims, 9 Drawing Sheets

WIZARD BUILDER, FOR APPLICATION SOFTWARE, BUILDING A SETUP WIZARD WHICH SETS UP A DEFACTO INTERFACE BETWEEN THE APPLICATION PROGRAM AND MONITORING OR CONTROL EQUIPMENT

STATEMENT REGARDING FEDERALLY SPONSORED RESEARCH AND DEVELOPMENT

None

BACKGROUND

1. Field of Invention

The field of the invention is a wizard which creates another wizard, which in turn enables an application computer program to interact with industrial controllers or sensors with certain specified characteristics.

2. Description of Prior Art

The use of application software, running on personal computers, to perform engineering computational tasks is becoming common. Such computational tasks require data values to be collected from engineering and industrial equipment. Manufacturers of the engineering and industrial equipment, and other companies, often provide software, sometimes called servers, that presents these data values to de-facto interfaces with the main application program. The application software needs to link to these servers through the de-facto interfaces. It is a difficult and time-consuming task to set up the application software to link to these servers. The problem is that the user of the application software needs to know the names and identifiers chosen by the manufacturer of the server software. There have been several methods proposed for solving this problem.

One approach is to use help systems and documentation. The help systems and documentation may be supplied by both the manufacturer of the server software and the manufacturer of the application software. The user of the application software has to examine the various help systems and documentation to discover the names and identifiers chosen by the manufacturer of the server software. The disadvantage of this approach is that help systems and documentation are often voluminous and do not guide the users through the task which they are attempting to complete.

Another approach is for the manufacturer of the server software to provide a browsing capability as part of the de-facto interface. The application software users can browse through all the possible names and identifiers that have been chosen by the server software manufacturer and make a selection when they find a required name or identifier. The disadvantage of this approach is that the users are still not guided through the task which they are attempting to complete. A second disadvantage of this approach is that the users must perform the browsing operation for each and every name or identifier that they are setting up. Often the names and identifiers that need setting up differ only slightly from each other.

An approach to overcoming the two disadvantages of the browsing approach is to use wizards. These wizards are programs and are part of the application software (or, hereinafter, application program) and are provided for the most common servers from the most common manufacturers. A wizard guides the user through the task of setting up the application software to properly interact with the server software. A wizard asks English-like questions, or questions in other suitable languages, and is aware of the slight differences in the names and identifiers chosen by the manufacturer of the server software. The wizard asks as few questions as possible to be able to complete the task of setting up the application software for the user.

The disadvantage of this approach is that wizards are often written in programming languages. Since the wizards are written in programming languages, they require programmers to write and alter them. A second disadvantage of this approach is that it is not a comprehensive solution since wizards are often not created for less common servers from less common manufacturers. There is a need for an intuitive means of creating and altering a wizard without requiring a programmer.

Representative of prior art is U.S. Pat. No. 5,859,637, to Leonard D. Tidwell, II, Jan. 12, 1999. In that invention, the human wizard creator manually composes a script in a disk file with a standard ASCII text edit program. The script is in a predetermined format. It uses a script-like language containing a predetermined set of commands. The human wizard creator must understand the format of the script file. The script is interpreted by a computer program when the script runs. The computer program uses the script to generate a wizard. The human user uses the wizard to enter information and to interact with an application program. In the invention of this application, the human wizard creator uses a computer program to create the wizard. The computer program itself stores a definition of the wizard in a disk file. The disk file is not edited directly by the wizard creator. It is not necessary for the human wizard creator to understand the format of the wizard file.

OBJECTS AND ADVANTAGES

The objects of the present invention are:

1. To provide an intuitive, easy to use method of creating a wizard for use with a particular server software that communicates with a particular piece of engineering or industrial equipment.

2. The person creating the wizard does not require computer-programming skills to create, alter, or use the wizard.

3. The setup wizard is portable and will be available for use by other users of the same pieces of engineering and industrial equipment, and such other users will not require programming skills to install, alter, or use the wizard.

4. To provide a wizard builder which does not use script files.

5. To provide a wizard file which can be moved to another computer by the process of using a floppy disk, serial link, network connection, or e-mail.

These objectives are met by the present invention. Still further objects and advantages will become evident from the detailed description of the invention, and the drawings.

SUMMARY OF THE INVENTION

The invention is a computer program that builds setup wizards. A setup wizard is an auxiliary program that enables the user to set up and use the main program (an application program). It helps the user tailor the application program to the user's equipment.

In particular, this setup wizard is typically related to an application program which optimizes certain industrial processes involving control of fluid flow, temperature, pressure, chemical reactions, and the like. The application program could perform other functions also. The main application program may optimize, through controllers, the industrial process in response to information on temperature, pressure, flowrate, and similar parameters provided by sensors. The setup wizard configures the main optimizing program to the controllers and sensors which the user is employing. The setup wizard contains data and parameters for controllers which are commonly used.

The computer program of the present invention is novel because it builds a setup wizard. It can create a setup wizard for any controllers with information entered by the user.

The technical details of the invention are as follows. The wizard builder is a computer program that creates a setup wizard based on user-entered information. When completed, the wizard builder creates a setup wizard. The setup wizard is a set of instructions that directs how two separate programs exchange information contained in a tag. The exchange is based on a few IDs (identification designations) entered by the user. A tag is a collection of storage addresses arranged in a specific structure. IDs identify the tag location. There may be more than one ID per tag. The components of the tag address may be a prefix/suffix, or prefix/offset, etc.

The present invention includes a method of creating, altering and using wizards. The present invention is a wizard builder which builds other wizards, called setup wizards. The setup wizard is in the form of a wizard disk file that can be readily moved to another computer or location. The wizard builder, generally contained in the application software, guides the user through the process of creating the setup wizard. It asks the user verbal questions about the types of engineering and industrial equipment, names, and identities used by the server software. The answers to the verbal questions are stored in the wizard disk file. When the setup wizard is used, the setup wizard reads the wizard disk file and asks the user the minimum amount of questions to complete the task of setting up the application software. The setup wizard does not use the answers to the verbal questions verbatim. It examines the questions required for all connection details and properties. It only asks a question of the user for a particular connection detail or property if an earlier connection detail or property did not require the same question to be asked. Thus some answers can be inferred from others.

The setup wizard can be altered by re-running the wizard builder that guides the user through setting up the wizard. In the re-run, the original answers to the verbal questions are shown. These original answers can be changed to produce corresponding changes to the wizard disk file. In this application, "verbal questions" means questions written in words in a language understood by a user, as opposed to just prompting the user to fill in blanks. It also does not refer to oral questions or questions conveyed by the sound of a voice.

DRAWING FIGURES

DETAILED DESCRIPTION OF THE DRAWINGS AND OPERATION OF INVENTION

Figure 1:
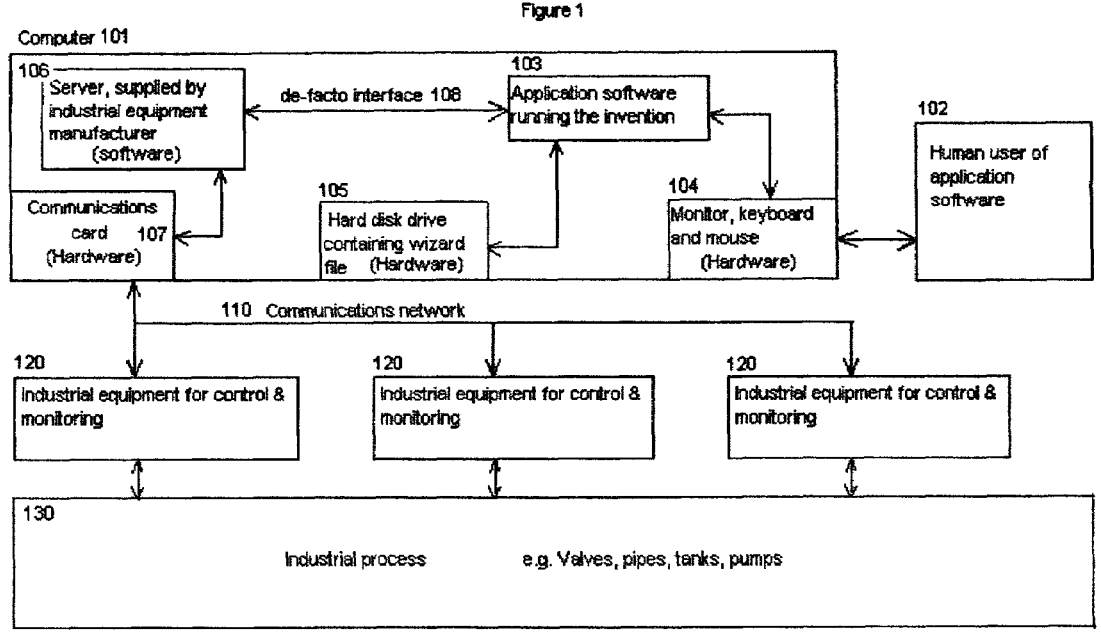
FIG. 1 is a diagram of a system where the invention is implemented.

FIG. 1 is a diagram of a system where the invention is implemented. A personal computer 101 contains a number of hardware and software components. The invention can be implemented in any computer containing the hardware components, and can be coded in any programming language. A human user 102 of the computer activates and runs the application software 103 by means of a monitor, keyboard and pointing device like a mouse 104. The application software creates, alters and reads the wizard file that is held on the hard disk 105 of the computer, or other memory means within the computer such as floppy disk, hard disk, zip disk, magnetic tape, RAM, or similar means known to those skilled in the art. The application software's primary task is to perform mathematical calculation or other functions on data values supplied by sensors that represent, for example, the state of some kind of industrial process 130. These data values will be represented by values inside a number of industrial control and monitoring equipment 120 units. The manufacturer of the industrial control and monitoring equipment units, or others, will have supplied and installed hardware and software components to allow the application software to access these data values. These hardware and software units typically comprise a communications network 110, a communications card or other hardware device 107 mounted in the computer, and server software 106 that drives and communicates with the communications card. The server software communicates with the application software by means of a de-facto software interface 108 that is commonly used, and is known to those skilled in the art.

Figure 2:
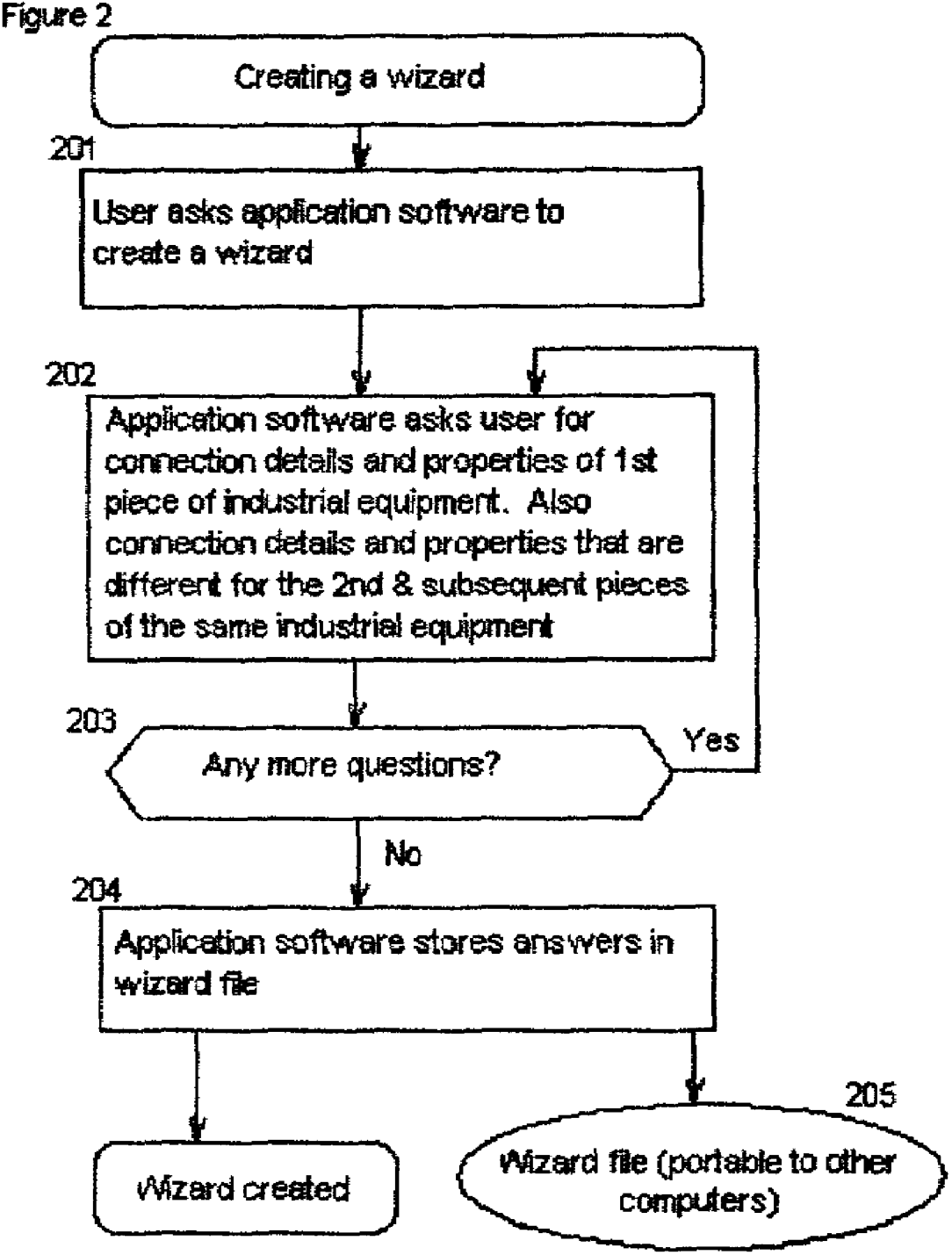
FIG. 2 is a flowchart of how the application software creates a wizard.

FIG. 2 is a flowchart of how the application software containing the wizard builder creates a wizard. The user of the application software invokes wizard creation 201. The application software requires the user to answer the following verbal questions 202. These questions concern the connection details and properties of the first piece of industrial equipment. The questions also concern the differences and similarities between the connection details and properties of the first piece of industrial equipment compared with the second and subsequent pieces of the same industrial equipment. Here is a list of the verbal questions, in English or other suitable language, typically asked by the application software when the wizard is being created:

(1) The name of the wizard.

(2) The name of the server. The user can browse for installed servers on his computer network.

(3) Is the server name fixed or should the wizard ask the user for the name of the server every time the wizard runs?

(4) The name of the access path or topic. This is extra information used by the server to help it to determine which piece of industrial equipment to access.

(5) Is the access path or topic name fixed or should the wizard ask the user for the name of the access path or topic every time the wizard runs?

Figure 5:
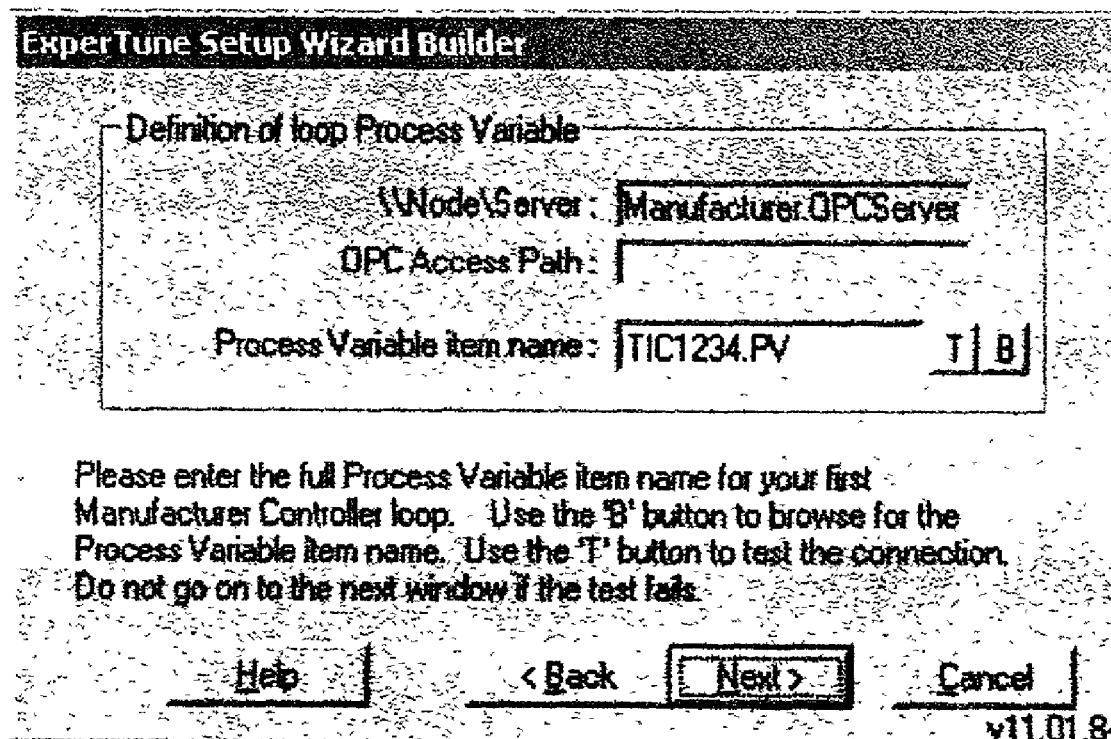
FIG. 5 is a typical screen which asks the user to enter the process variable item name.

(6) The item name used by the server to uniquely identify the first data value required by the application software. If the server supports browsing, the user can browse the server for the required name; see FIG. 5 for an example.

Figure 6:
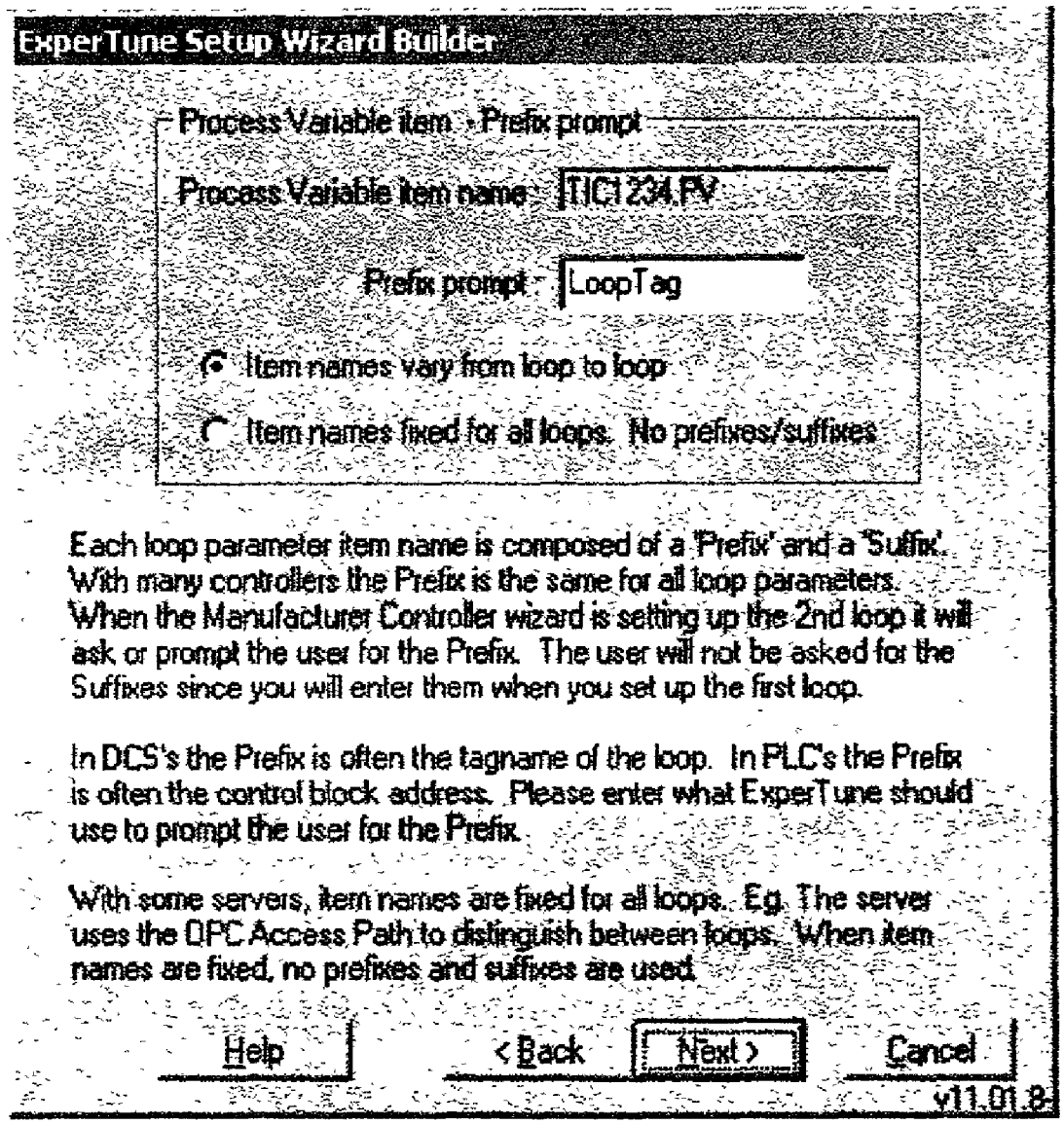
FIG. 6 is a typical screen which asks the user to enter the prefix prompt.

(7) When the wizard runs to set up the application software for another piece of industrial equipment, will the item name for the first data value always the same? See FIG. 6 for an example.

(8) Assuming the item names change for other pieces of industrial equipment, how can the wizard use the first item name to create the setup and subsequent item names?

Figure 7:
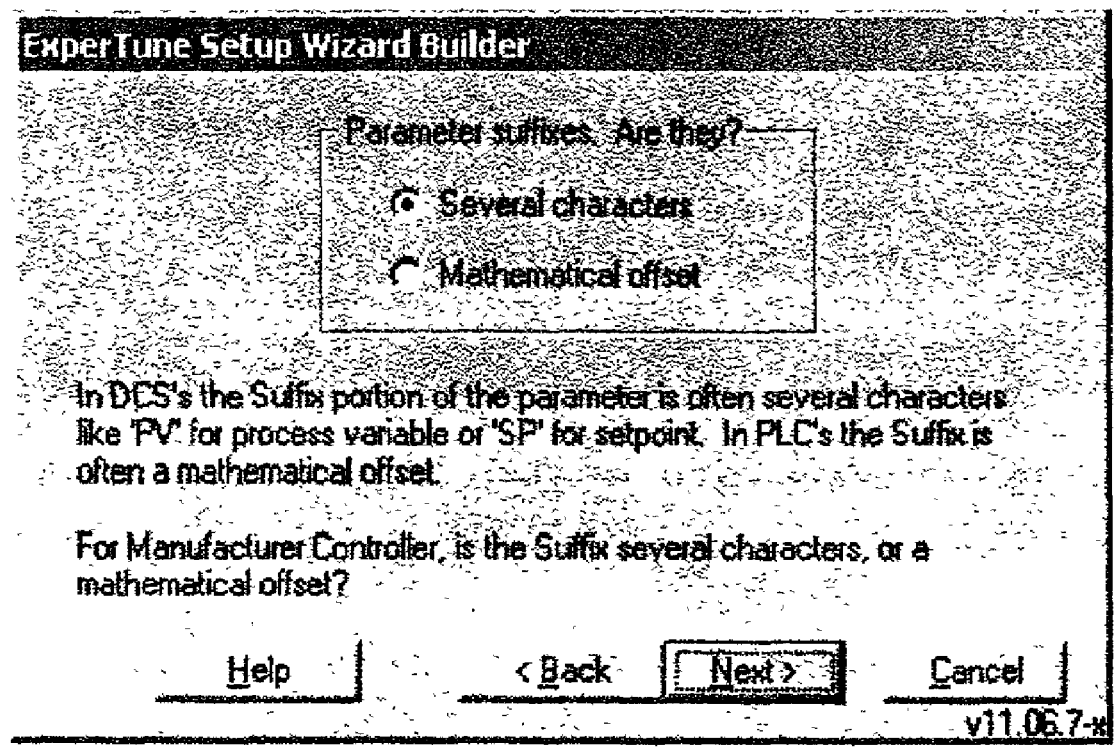
FIG. 7 is a typical screen which asks the user to enter the nature of the suffixes.

(9) Is the setup item name a mathematical offset from the first item name, or does the setup item name have the same prefix but a different suffix from the first item name? See FIG. 7 for an example.

Figure 8:
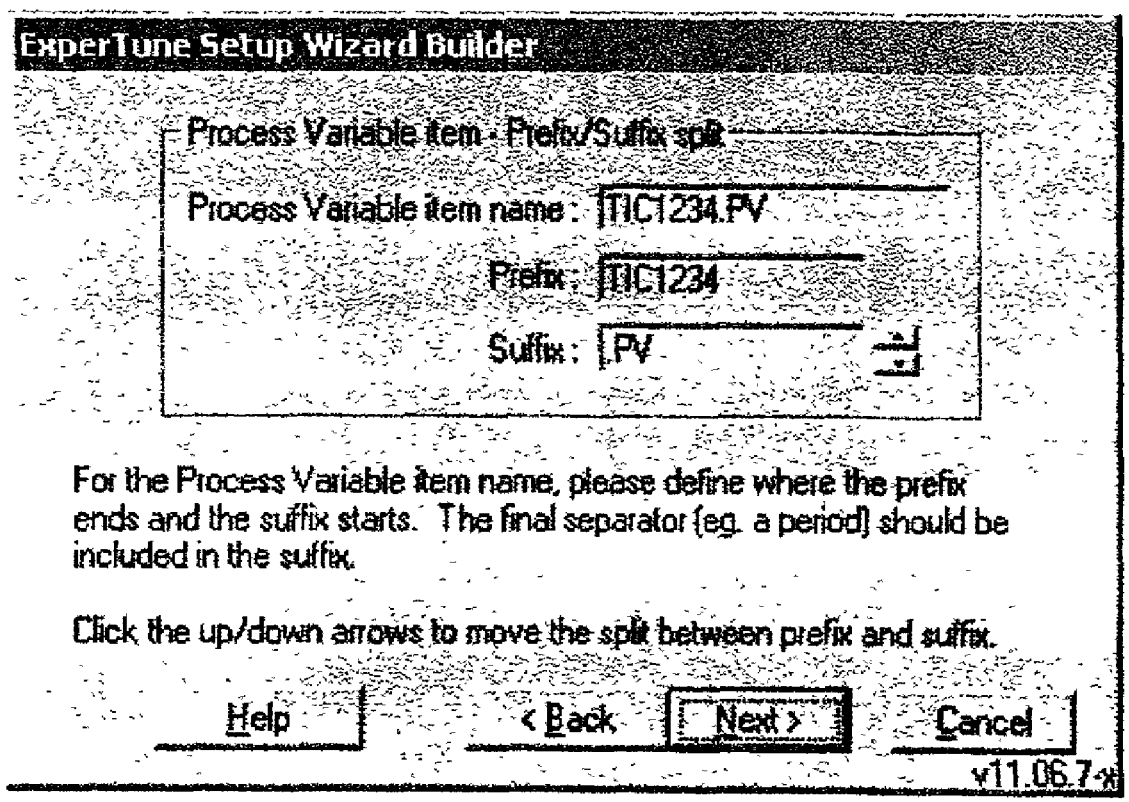
FIG. 8 is a typical screen which asks the user to indicate where the prefix ends and the suffix starts.

(10) The wizard asks the user to split the first item name into the prefix part and the suffix part. See FIG. 8 for an example. The user must then enter the second and subsequent item names for the first piece of industrial equipment. To do this he enters only the suffix part of the item name. The prefix part of the name must be the same as the prefix part of the first item name. The user is given the choice of creating a new prefix if he wishes. If the server supports browsing, the user can browse the server for the required name, and the new suffix is automatically extracted from the chosen name. The user carries on in this way entering the item names for the first piece of industrial equipment. There could be any number of item names to enter depending on the requirements of the application software and the nature of the industrial equipment.

(11) Sometimes the user is asked if the server is able to read a particular property of the industrial equipment. If the server is not able to read a particular property of the industrial equipment, the user is asked to enter the property value directly. If the server is able to read a particular property of the industrial equipment, the user is asked to create an item name to read that property value.

Having received an answer to one of the questions, the applications software continues to test if there is another question 203. When the user has answered all the questions, the applications software 204 stores the answers in the wizard file 205. The wizard file holds the answers to all the questions that have been asked. The format of the wizard file is not significant as it is only read or changed by the application software.

The name of the setup wizard corresponds to the name of the wizard file. The user will then have created a wizard and set up the application software with the connection details and properties of the first piece of industrial equipment.

Here is an example of part of a setup wizard file. In this implementation of the invention, the format of the wizard file is ASCII text. This part of the wizard file records information supplied by the user in the examples in FIGS. 5, 6, 7 and 8.

```
. . .
[PV]
Suffix=.PV
Prompt=LoopTag
. . .
```

Figure 3:
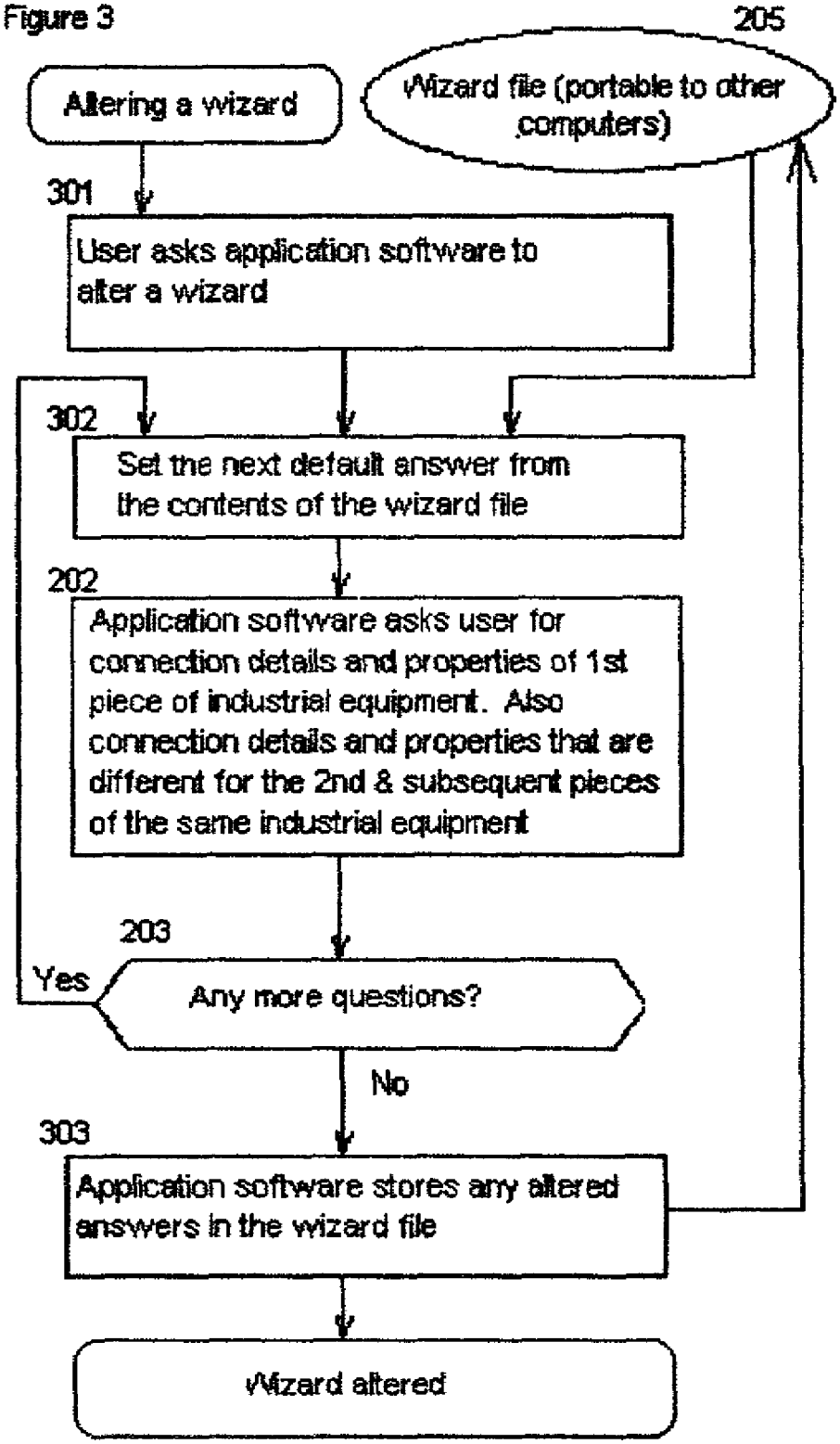
FIG. 3 is a flowchart of how the application software, having created a wizard can subsequently alter a wizard.

FIG. 3 is a flowchart of how the application software, having created a wizard can subsequently alter a wizard. The user of the application software invokes wizard alteration 301. The application software responds by re-running the verbal questions that were asked when the wizard file was created 202 and 203. In alteration mode, the previous answers to the questions are read from the setup wizard file and presented to the user 302 as the default answer. The user is able to alter his previous answers if desired. When the user alters a previous answer, the application software alters the contents of the setup wizard file 303. If the user wishes to change the name of the setup wizard, he needs to change only the name of the wizard file.

Figure 4:
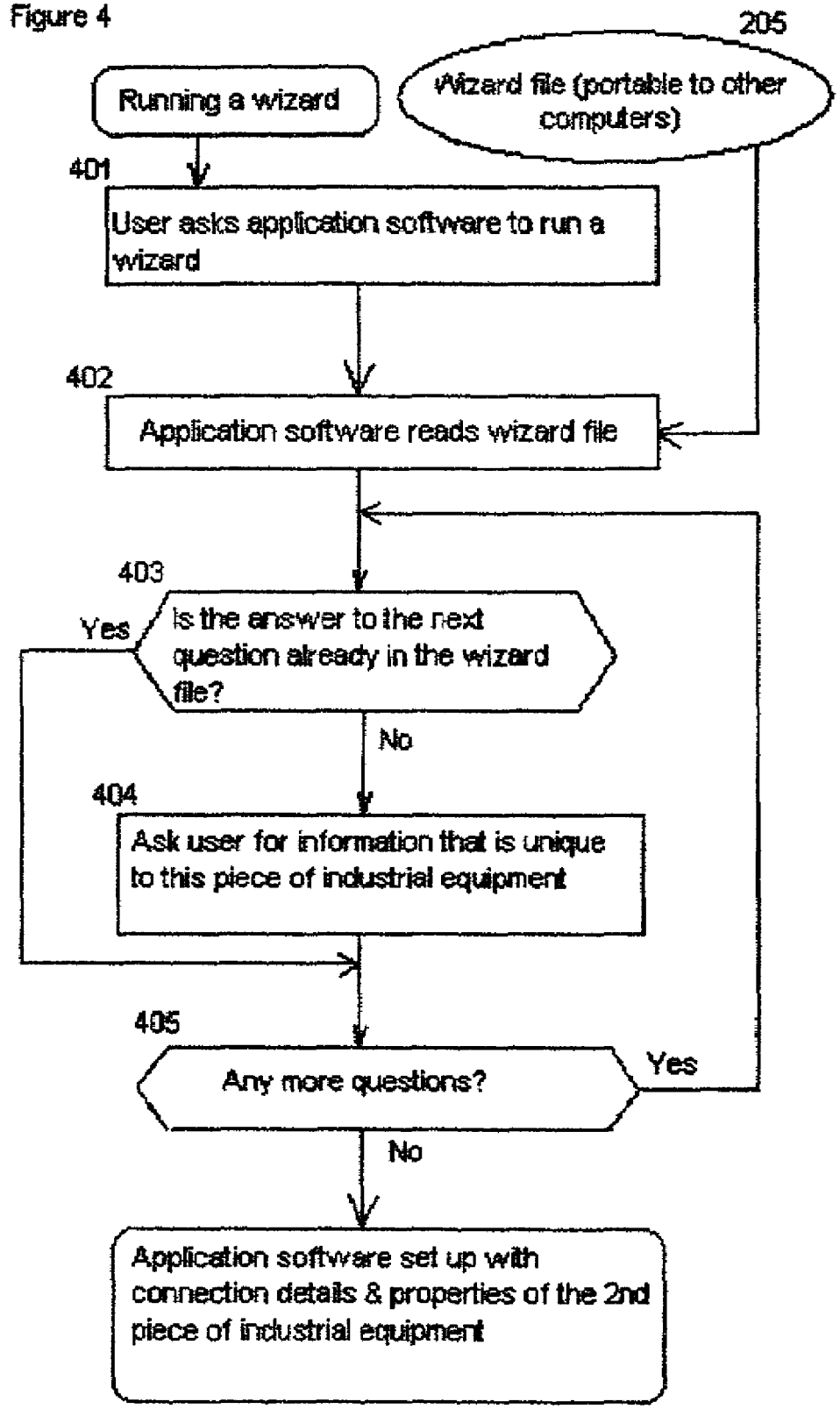
FIG. 4 is a flowchart of how the application software, having created a wizard can subsequently run the wizard.

FIG. 4 is a flowchart of how the application software, having created a wizard can subsequently run the wizard. The setup wizard file may have been created on another computer and moved to the application software's computer. The reason for running the wizard is to set up the application software with the connection details and properties of a second or subsequent similar piece of industrial equipment. The user of the application software invokes running the wizard 401. The application software reads the setup wizard file 402. The application software goes through the connection details and properties that it needs, to set itself up for another similar piece of industrial equipment 403.

Connection details and equipment properties may be fixed and in the created wizard file. In this case the application software is set up with the required connection detail or equipment property directly from the wizard file.

Connection details may be variable and consist of a prefix and suffix. In this case the user is asked for a new prefix, and the suffix is in the wizard file. The question used by the wizard to ask the user for a new prefix is in the wizard file.

Connection details may be variable and consist of a base address and offset. In this case the user is asked for the base address, and the offset is in the wizard file. The question used by the wizard to ask the user for a new base address is in the wizard file.

Equipment properties may be variable and not able to be read from the industrial equipment. In this case the user is asked for the equipment property value.

Equipment properties may be variable and able to be read from the industrial equipment. In this case the application software sets up an item name for reading the property and uses this item name to read the property value.

If information about the connection detail or property is not in the created wizard file, then the application software asks the user to supply the missing information 404. This continues until all the connection details and properties are set up within the application software 405.

Figure 9:
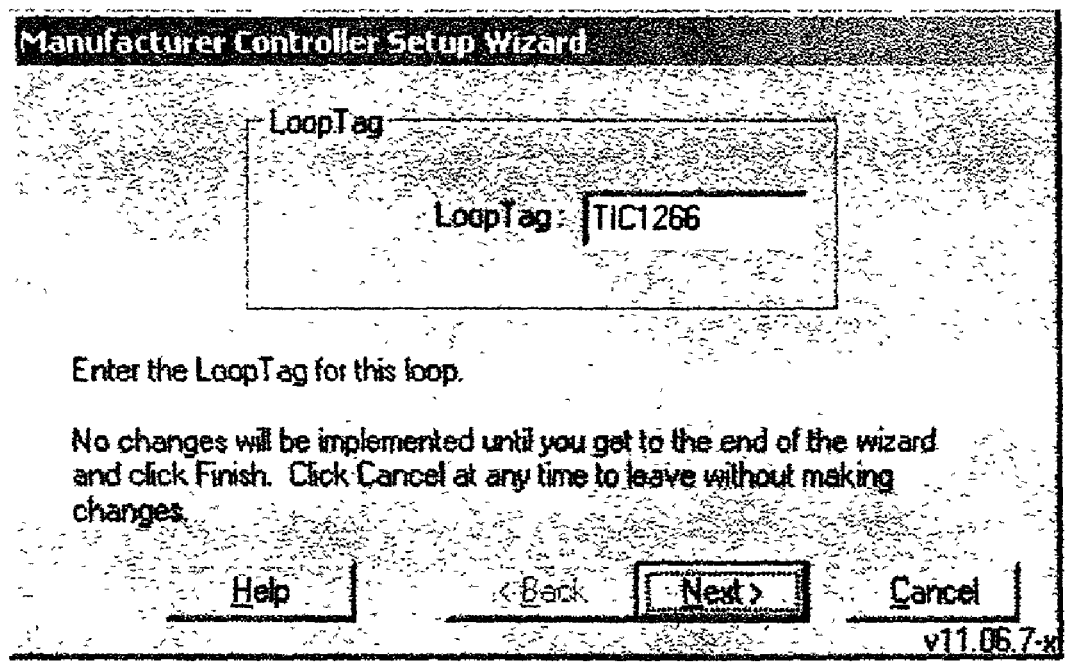
FIG. 9 is a typical screen which asks the user to enter the loop tag for a loop.

FIG. 9 is an example of a screen that appears when the wizard runs. The user has only to enter a new name, a new "LoopTag", for the second piece of industrial equipment. From information held in the wizard file, the application software knows to append ".PV" to whatever the user typed in answer to "LoopTag". So in this case, the application software automatically creates the item name for the second piece of industrial equipment to be, for example, "TIC1266.PV". Other item names for the same piece of industrial equipment will consist of the same prefix, "TIC1266", with different suffixes. Therefore, by using the invention, the application software, containing the wizard builder, is able to set up the second piece of industrial equipment with an easy-to-use interface. The user is asked for only the necessary information. The user does not need any programming skills.

DESCRIPTION

Preferred Embodiment

The preferred embodiment is application software, written in Visual Basic and running on a personal computer running under the Windows operating system. The de-facto interfaces used by the application software to communicate with the server software are DDE (Dynamic Data Exchange) and OPC (OLE for Process Control). The industrial control and monitoring equipment are any make of Single Loop Controller, Programmable Logic Controller (PLC) or Distributed Control System (DCS) from any manufacturer.

Additional Embodiments

The wizard builder of the present invention can be adapted to work with a very wide range of application programs which control or monitor processes in real time. The wizard builder can produce a setup wizard which can work with a wide range of monitoring and control devices from many different manufacturers and having many different operating characteristics. Many programming languages can be used to make the wizard builder including Visual Basic, C, C++, Delphi, Java, C Sharp, ASP.net, and others known to those skilled in the art. An advantage of the present invention is that the wizard builder can be produced based on many programming languages which interact well with various application programs in various languages, and which may run better on the computers of particular users. The present invention is a concept and sequence of steps and interactions which are not limited to particular computer programming languages.

The computer running the wizard builder is a personal computer, containing a communications card or other hardware device and server software that drives and communicates with the communications card. The personal computer may be running any operating system software means, for example Windows, Unix, Linux, or others known to those skilled in the art.

The requirements of the de-facto interface that is used to communicate between the server and the application software are that it must be well-known, and be capable of passing data values in real-time between two programs running in a personal computer. Examples of two such interfaces currently available are: DDE (Dynamic Data Exchange) and OPC (OLE for Process Control).

The industrial control and monitoring equipment units could be any piece of industrial equipment which contains an embedded micro-processor and which is able to offload data values that represent the current state of an industrial process. Examples include machine tools, motor drives, robots, intelligent valves and pumps, telemetry outstations, programmable controllers and distributed control systems.

The invention of the application includes a computer readable memory means such as a floppy disk, compact disc, hard disk, zip disk, magnetic tape, RAM, or similar data storage means known to those skilled in the art, which means contains the computer program process of the invention. The invention of the application also includes the process of transmitting the computer program process of the invention in real time by means of wire, radio, laser beam, or other transmission means known to those skilled in the art. The invention of the application also includes a computer means such as a microchip, personal computer, mainframe computer or any similar computer means knowing to those skilled in the art containing the computer program process of the invention. The operating system software means may include but is not limited to Windows, Unix, Linux, Apple and others known to those skilled in the art.

Tests

One example of using the invention is within the ExperTune Tuner/Analyzer application program. This program is sold by ExperTune, Inc. 4734 Sonseeahray Drive, Hubertus, Wis. 53033. This software is used by engineers to optimize industrial process control loops.

One user of the ExperTune software is employed by Air Products Company as a process engineer and has no knowledge of computer programming. This user created a wizard to connect the ExperTune software to Honeywell's TDC 3000 distributed control system. The wizard was to connect to the Honeywell GUS (Global User Station) workstation via the DDE (Dynamic Data Exchange) de-facto interface.

Another user of ExperTune software is employed by Siemens as a process engineer and has no knowledge of computer programming. This user created a wizard to connect the ExperTune software to the Siemens PCS 7 distributed control system. The wizard was to connect to the WinCC HCI (Human Computer Interface) program used in PCS 7 via the OPC (OLE for Process Control) de-facto interface.

Both these wizards are now supplied by ExperTune, Inc. and available for use by any ExperTune user.

Thus the wizard builder produces a new and useful result in producing wizards (setup wizards) which can adapt application programs, for example, to particular devices for monitoring or controlling industrial processes in real time, all without requiring computer programming abilities of the user. The setup wizard can also be transferred by means of a wizard file to another computer to work with the same application program on that computer.

CONCLUSIONS, RAMIFICATIONS AND SCOPE

A number of changes are possible to the program described above, while still remaining within the scope and spirit of the invention. The specifics about the form of the invention described in this application are not intended to be limiting in scope. The scope of the invention is to be determined by the claims, and their legal equivalents, not the examples given above. While the methods disclosed in this application have been described and shown as particular steps performed in a specified order, these steps may be reordered, combined, or subdivided in various ways to constitute an equivalent method, without departing from the concept and disclosure of the invention in this application. Therefore, unless the description of the present invention specifically indicates otherwise, the order and grouping of the steps should not be construed as a limitation of the invention in this application.

I claim:

1. A computer program process, called a wizard builder, executable on a computer, for adapting an application program to function with a Single Loop Controller, Programmable Logic Controller, or Distributed Control System, wherein the wizard builder constructs a setup wizard which sets up a de facto interface between a Single Loop Controller, Programmable Logic Controller, or Distributed Control System and the application program, wherein the setup wizard is constructed by means of asking a human user of the application program for answers to simple verbal questions, in English or other language convenient to a human user, about the model and manufacturer of the Single Loop Controller, Programmable Logic Controller, or Distributed Control System, and wherein the wizard builder does not require a human user to have any knowledge of writing or using computer programs.

2. The process of claim 1, further comprising a computer program process, wherein a human user of the application program can alter the setup wizard, thus creating another setup wizard, which can be run to set up an application program with connection details and properties of other Single Loop Controllers, Programmable Logic Controllers, or Distributed Control Systems.

3. The process of claim 1, further comprising a computer program process, wherein the setup wizard constructed by the computer program process is adapted to be moved to another computer by a human user without any knowledge of writing computer programs.

4. The process of claim 3, wherein the setup wizard is in the form of a disk file that can be readily moved to another computer.

5. The process of claim 2, wherein the setup wizard is adapted to be altered by the wizard builder program which displays original answers to the verbal or other suitable language questions and provides a prompt for a human user to enter new answers about the Single Loop Controller, Programmable Logic Controller, or Distributed Control System.

6. The process of claim 1, further comprising a server program which contains data values for many Single Loop Controllers, Programmable Logic Controllers, or Distributed Control Systems, and wherein the setup wizard runs and sets up a de facto interface between the application program, and the server program.

7. The process of claim 1, further comprising a process for creating the setup wizard comprising the steps of:
    (a) the user's instructing the wizard builder to create a setup wizard,
    (b) the wizard builder's displaying verbal questions for the user requesting details of connection to, and operating properties of, or both, a first Single Loop Controller, Programmable Logic Controller, or Distributed Control System, and subsequently, in sequence, of any other Single Loop Controller, Programmable Logic Controller, or Distributed Control System having different connection details or operating properties, and
    (c) the wizard builder's storing answers in a setup wizard file which defines the setup wizard.

8. The process of claim 1, further comprising creating a setup wizard file, and further comprising a process for altering the setup wizard comprising the steps of:
    (a) the user's instructing the wizard builder to alter the setup wizard,
    (b) the wizard builder's rerunning the verbal questions asked when the setup wizard file was created,
    (c) the wizard builder's setting default answers to the verbal questions from the setup wizard file,
    (d) if the user alters a previous answer, the wizard builder's altering the setup wizard file,
    (e) the wizard builder's asking the user by verbal questions for details of connection to, or operating properties of, or both, a first Single Loop Controller, Programmable Logic Controller, or Distributed Control System, and subsequently, in sequence, any other Signal Loop Controller, Programmable Logic Controller, or Distributed Control System having different connections details or operating properties, and
    (f) the wizard builder's storing any alternate answers in the setup wizard file.

9. The process of claim 1, further comprising creating a setup wizard file, and further comprising a process for running a setup wizard comprising the steps of:
    (a) the user's asking the setup wizard to run,
    (b) the setup wizard's reading the setup wizard file,
    (c) the setup wizard's determining whether the answers to verbal questions are already in the setup wizard file or can be inferred from the answers in the setup wizard file, and
    (d) if the answer in the preceding step is yes, stopping the process,
    whereby the application program is left in a state of having connection details and properties of the Single Loop Controllers, Programmable Logic Controllers, or Distributed Control Systems.

10. The process of claim 1, further comprising creating a setup wizard file, and further comprising a process for running a setup wizard comprising the steps of:
    (a) the user's asking the setup wizard to run,
    (b) the setup wizard's reading the setup wizard file,
    (c) the setup wizard's determining whether the answers to all the verbal questions are already in the setup wizard file or can be inferred from the answers in the setup wizard file,
    (d) if the answer to the preceding question is no, the setup wizard's asking the user for information that is unique to a new Single Loop Controller, Programmable Logic Controller, or Distributed Control System, and
    (e) the setup wizard's incorporating connection details and properties of a new Single Loop Controller, Programmable Logic Controller, or Distributed Control System,
    whereby the application program is left in a state of having connection details and properties of the Single Loop Controller, Programmable Logic Controller, or Distributed Control System.

11. The process of claim 1, wherein the wizard builder computer program process is contained within the application software, and wherein a setup wizard file is held on a memory means within a computer.

12. The process of claim 1, wherein the computer program process wizard operates without the use of script files.

13. The process of claim 7, wherein the setup wizard file is adapted to be moved to another computer for use with the same or similar application program installed in the other computer.

14. The process of claim 8, wherein the setup wizard file is adapted to be moved to another computer for use with the same or similar application program installed in the other computer.

15. The process of claim 3 wherein the computer running the application program comprises a personal computer, containing a communications card and server software that drives and communicates with the communications card, and wherein the personal computer is running an operating system software means.

16. The process of claim 13, wherein the setup wizard file is adapted be moved to another computer by a process of using a transfer means selected from the group consisting of: a floppy disk, serial link, network connection, or email.

17. An article of manufacture comprising a computer readable memory means on which is recorded the computer program process of claim 3.

18. The process of transferring by a means for transferring computer programs in real time, the computer program process of claim 3.

19. An article of manufacture comprising a computer means programmed with the computer program process of claim 3.

* * * * *